No. 821,091. PATENTED MAY 22, 1906.
J. Y. EVANS.
CLUTCH.
APPLICATION FILED SEPT. 8, 1904.
2 SHEETS—SHEET 1.
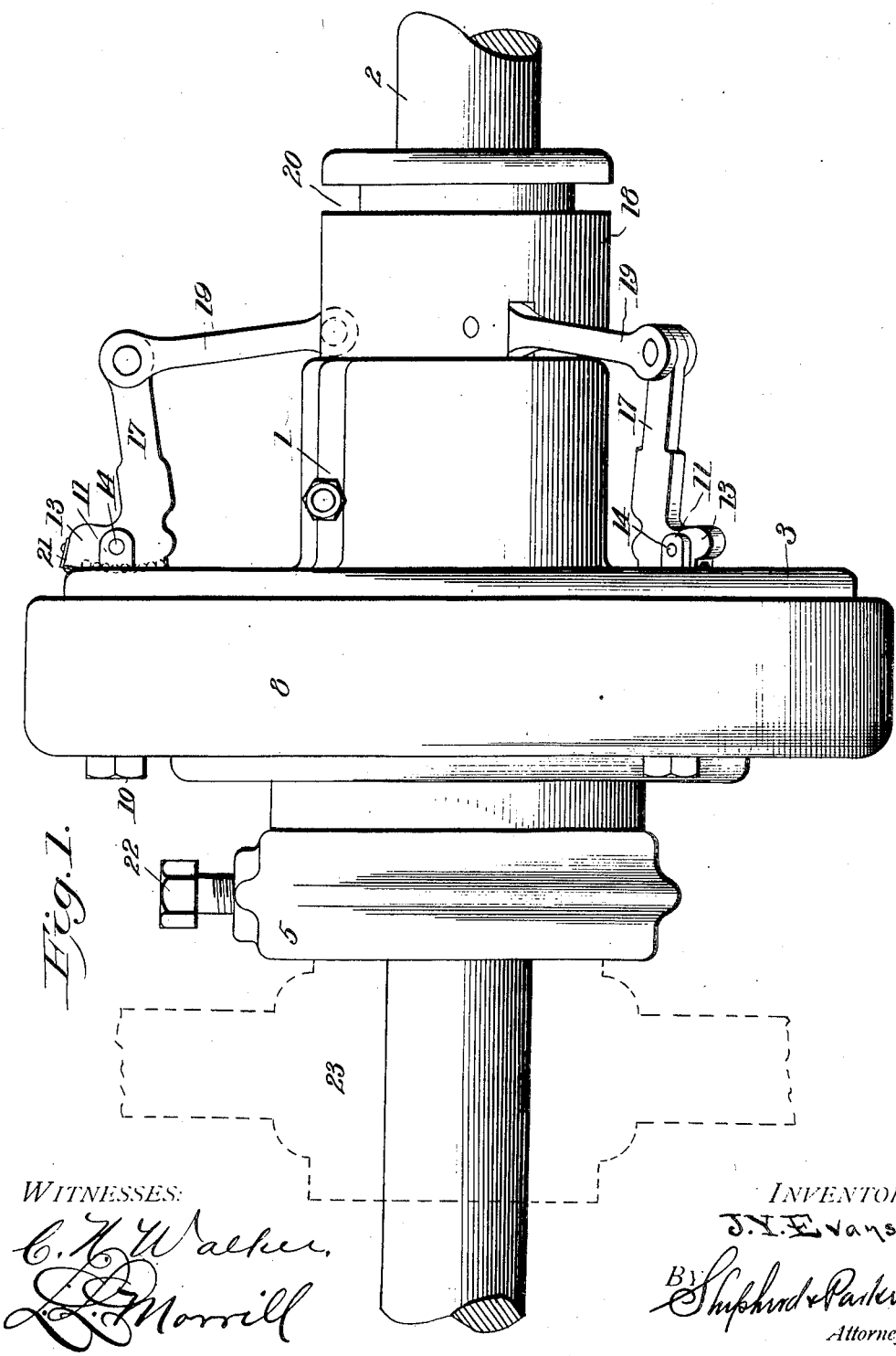
WITNESSES:
C. H. Walker,
L. F. Morrill
INVENTOR
J. Y. Evans
By Shepherd & Parker
Attorneys

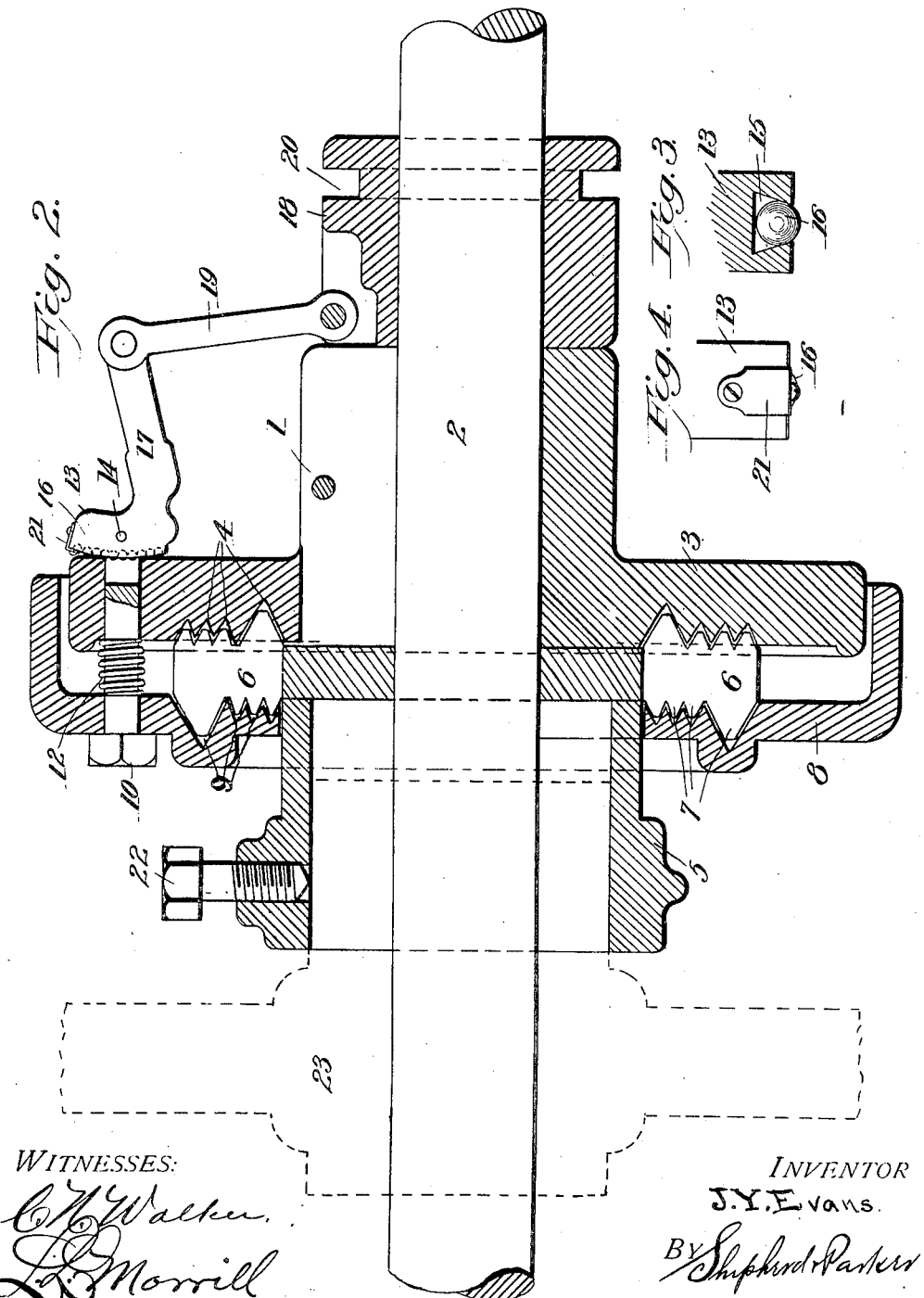

UNITED STATES PATENT OFFICE.

JEREMIAH Y. EVANS, OF PHILADELPHIA, PENNSYLVANIA.

CLUTCH.

No. 821,091.     Specification of Letters Patent.     Patented May 22, 1906.

Application filed September 8, 1904. Serial No. 223,690.

*To all whom it may concern:*

Be it known that I, JEREMIAH Y. EVANS, a citizen of the United States, residing at 2830 West Albert street, Philadelphia, in the county of Philadelphia and State of Pennsylvania, have invented new and useful Improvements in Clutches, of which the following is a specification.

My invention relates to clutches, and more especially to friction-clutches.

The object of my invention is to provide a friction-clutch adapted for use in any place where a clutch is required, which shall be easily and positively manipulated.

A further object of my invention is to provide a clutch presenting a very large amount of surface to the action of a clutching member.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a view of my improved clutch in side elevation. Fig. 2 is a vertical longitudinal sectional view of my clutch. Fig. 3 is a transverse sectional view of the cam, showing the ball-race and anti-friction-balls mounted therein. Fig. 4 is a detail view showing the manner of retaining the ball in the ball-race.

Like characters of reference designate corresponding parts throughout the several views.

In the preferred embodiment of my invention I clamp a split hub 1 securely upon a shaft 2. The split hub 1 is provided at one end with a flange-like disk 3, which is provided in its face with one large and a plurality of small V-shaped annular grooves 4. A sleeve 5 is rotatorily mounted upon shaft 2 and rigidly secured to a friction-plate 6. The friction-plate 6 is provided upon each side with one large and a plurality of small outstanding V-shaped annular projections 7, adapted to fit within the annular grooves 4. A collar 8 is mounted upon and embraces loosely sleeve 5 and is provided with a plurality of V-shaped annular grooves 9 of requisite conformation to fit upon outstanding V-shaped projections 7. A bolt 10 passes through collar 8 and disk 3 and is provided at its end opposite the head with lugs 11. A spring 12 loosely embraces bolt 10, adapted to hold collar 8 normally away from disk 3 and friction-plate 6. A cam 13 is pivotally mounted between lugs 11 by pin 14 passing therethrough. The cam 13 is provided in its face with a ball-race 15, having mounted therein balls 16, adapted to bear against the face of disk 3. The cam 13 is provided with a lever 17, extending away from the disk 3. A sleeve 18 is loosely mounted upon shaft 2, capable of both rotary and longitudinal movement in relation thereto. A link 19 connects collar 18 with lever 17. The collar 18 is provided with a groove 20, adapted for the implacement therein of a lever or other mechanical means for moving the sleeve longitudinally on the shaft and permitting the rotary movement of the sleeve 18 relative to such a lever. The cam 13 is provided at one end with a plate 21, adapted to close the end of the ball-race 15 and retain the ball 16 operatively within the ball-race 15.

The sleeve 5 is provided with means, as the set-screw 22, adapted to secure the sleeve 5 to the hub of a wheel, as 23, rotatorily mounted upon shaft 2.

The operation of my improved clutch is as follows: With the parts disposed as shown in Fig. 2 the friction-plate 6 is free to rotate between the disk 3 and the collar 8 if the friction-plate be positively driven, or the disk 3 and the collar 8 are free to rotate without moving friction-plate 6 if the said disks and collar be positively driven. For the sake of clearness it will be supposed that the friction-plate 6, rigidly secured to sleeve 5, is positively driven, as by the pulley 23. With the friction-plate so positively driven the shaft 2 and the disk 3 and collar 8 are idle. It being now desired to transmit motion to the shaft 2 the collar 18 is moved longitudinally on the shaft 2, thus drawing down on link 19 and lever 17. The displacement of lever 17 causes the balls 16, mounted in the cam 13, to ride along the face of disk 3, and by reason of the shape of cam 13 a longitudinal strain is exerted upon bolt 10, thereby drawing the disk 3 and the collar 8 together against the tension of spring 12. The V-shaped grooves 4 and 9 in the disk and collar fit upon and engage the V-shaped projections 7 of disk 6 and firmly bind such plate between the disk 3 and the collar 8. The frictional contact between the plate 6 and the collar 8 and disk 3 causes the disk and collar to rotate in unison with the positively-driven plate 6, transmitting rotary motion to the hub 1 and the shaft 2, upon which it is rigidly clamped.

It is obvious that numerous minor changes may be made in the form and construction of my clutch without departing from the spirit of my invention or the scope of the claims.

Having thus described my invention, what I claim as novel, and desire to secure by Letters Patent, is—

1. In a clutch a plurality of members adapted to frictionally engage each other, one of said members being provided with a plurality of V-shaped annular projections of different size and another member provided with annular grooves corresponding in size and arrangement with the projections on the first-named member, and means for exerting a clamping pressure between the two members.

2. In a clutch, a friction-plate provided with a plurality of V-shaped annular projections of different size upon each side thereof, plates provided with grooves corresponding in size and arrangement with the said projections, mounted upon each side of the friction-plate and means for exerting a clamping pressure between the said plates and disk.

3. In a clutch, a friction-plate provided with a large V-shaped annular projection and one or more relatively small V-shaped annular projections adjacent thereto upon each side of the said plate, the annular arrangement of the projections on one side of the plate being opposite to the annular arrangement of the projections on the other side, friction-disks provided with grooves corresponding in size and arrangement with the said projections mounted adjacent to the friction-plate and located on each side thereof, and means for exerting a clamping pressure between the said plates and disk.

4. In a clutch, a friction-plate and a disk adapted to frictionally contact therewith, to produce a clamping engagement, a cam provided with a ball-race on its bearing-surface and balls therein, said cam bearing upon the surface of the said disk, and means to operate the cam to exert a clamping pressure between the plates and disk.

In testimony whereof I affix my signature in presence of two subscribing witnesses.

JEREMIAH Y. EVANS.

Witnesses:
EDWARD A. STAUDENMAYER,
WILLIAM WARREN.